US005499435A

United States Patent [19]

Kortenkamp et al.

[11] Patent Number: 5,499,435

[45] Date of Patent: Mar. 19, 1996

[54] TOOL FOR PLACING SEALING STRIP

[75] Inventors: Jürgen Kortenkamp, Dornbirn; Gebhard Gantner, Nenzing, both of Austria; Walter Winkler, Game, Switzerland

[73] Assignee: Hilti Akiengesellschaft, Schaan, Liechtenstein

[21] Appl. No.: 255,691

[22] Filed: Jun. 8, 1994

[30] Foreign Application Priority Data

Jun. 8, 1993 [DE] Germany .......................... 43 18 964.4

[51] Int. Cl.[6] .................................................... B23P 19/02

[52] U.S. Cl. ............................................................... 29/235

[58] Field of Search .............................. 29/238, 239, 235, 29/263, 265, 451, 460

[56] References Cited

U.S. PATENT DOCUMENTS

| | | | |
|---|---|---|---|
| 3,021,112 | 2/1962 | Forman | 29/239 |
| 3,052,973 | 9/1962 | Williams | 29/265 |
| 3,307,249 | 3/1967 | Hohoff | 29/235 |
| 3,705,581 | 12/1972 | Drake | 29/239 |
| 4,433,463 | 2/1984 | Du Val | 29/239 |
| 4,443,001 | 4/1984 | Haerer | 29/239 |
| 5,127,143 | 7/1992 | Urlacher | 29/235 |

*Primary Examiner*—Robert C. Watson
*Attorney, Agent, or Firm*—Anderson Kill Olick & Oshinsky

[57] ABSTRACT

A tool for placing and securing sealing strip (11) into a joint gap (19) between structural parts (17, 18) includes a lead-in device (10) guiding the sealing strip (11) into the joint gap (19), an insertion device (8) aligning the sealing strip (11) and a contact pressure device (7) with two coextensive contact pressure faces (12, 13) for pressing the sealing strip (11) within the joint gap (19). A spacing (A) between the contact pressure faces (12, 13) transversely of their coextension is variable.

5 Claims, 3 Drawing Sheets

TOOL FOR PLACING SEALING STRIP

BACKGROUND OF THE INVENTION

The present invention is directed to a tool for placing sealing strip in the joint gap or groove of structural parts with a lead-in device for guiding the sealing strip into the gap and an insertion device for aligning the sealing strip in the gap. Further, the tool has a stop face for abutting the tool on the outside surface of the structure and a contact pressure device projecting at least partially from the stop face into the joint gap for securing the sealing strip in the gap.

In massive construction units, which include concrete, precast parts, masonry including lightweight concrete as well as complete thermal protection, in wooden or metal structures, and in the region of window seals in the joint formed by a window member and a structural component, gaps exist which are sealed by sealing strip.

Sealing strip is supplied coiled in reels in a compressed state and it is placed into the joint gap in such state.

After the strip has been placed, the compression is released and the strip is expanded affording a secure and lasting seal and also compensating for any unevenness within the gap. After the compression has been released, the strip generates a force which presses strongly against the oppositely arranged side walls of the joint gap.

Commercially available sealing strip has an adhesive layer which can be brought into contact with one of the oppositely located sidewalls of the gap. Such adhesive layer has the advantage of retaining the sealing strip within the gap so that it cannot fall out of vertically extending or overhead joint gaps before the compressive forces have been released.

In the past, to assure good adhesion between the adhesive layer and the corresponding side wall of the joint gap, means, such as screwdrivers or spatulas, have been used for pressing the sealing strip against the side wall of the gap.

A device for placing sealing strip in the form of foam material sections is disclosed in DE-GM 87 07 753. The device includes a frame, an introducing device, an insertion device and a contact pressure device. This known device is used for sealing strip inserted into joint gaps having larger dimensions and is intended to prevent penetration of water. Upon placing the sealing strip in the joint gap, the strip is compressed by approximately 25% of its unstressed width and is placed in the gap. After the tool is removed, stresses in sealing strip are released and press the strip against the oppositely located side walls of the gap. The sealing strip placed in the gap is compressed to an appropriate depth by the contact pressure device.

The tool set forth in DE-GM 87 07 753 is suited for placing precompressed sealing strip, since the contact pressure device exerts a contact pressure on the sealing strip directed parallel to the side walls of the joint gap. Contact pressure directed perpendicular to one of the two side walls of the gap cannot be applied by this known tool.

SUMMARY OF THE INVENTION

Therefore, the primary object of the present invention is to provide a tool for placing sealing strip in joint gaps enabling the lead-in and placement as well as pressing of the sealing strip perpendicularly to one of the two side walls of the joint gap. Its object is attained by providing the contact pressure device with at least two contact pressure faces with the spacing between the contact pressure faces being variable.

Basically, the two contact pressure faces extend parallel to one another and are displaceable relative to one another, so that the spacing between them can be varied. Such a contact pressure device is shaped, whereby the two contact pressure faces in an initial position can be inserted between the sealing strip placed in the joint gap and one of the two side walls of the gap. By subsequently actuating the contact pressure device the contact pressure faces are displaced away from one another, with one contact pressure face abutting one side wall of the gap and the other contact pressure face pressing against the opposite side of the sealing strip from the side bearing the adhesive layer.

After exerting their pressure, the two contact pressure faces are returned to their initial position for moving the tool in the long direction of the gap, for effecting another contact pressure operation at another location.

To facilitate ease in the use of the tool for placing sealing strip, at least one of the contact pressure faces is connected to a drive for moving one contact pressure face relative to the other. The drive affords a uniform motion of the contact pressure faces relative to one another and a uniform contact pressure acting on the sealing strip.

Advantageously, the drive can be provided with a manually operable device, such as a feed device operated by an actuating lever in a handle of the tool. When the actuating lever is displaced, an actuating rod is moved axially forward by a feed mechanism and when the actuation lever is released it is returned to its initial position. In this arrangement, the actuating rod is connected with the contact pressure device.

The ease in manipulating such a tool is increased by connecting a drive motor, such as an electric motor, with the drive. A torque limitation clutch can be positioned between the drive and the motor and the clutch can be provided with an adjustable response torque.

The contact pressure device is arranged with at least one contact pressure face formed by an outer surface of a part of an eccentric device. The eccentric device is rotatable so that the surface forming the contact pressure face is displaceable relative to a second contact pressure face extending parallel to it, so that the spacing between the surface on the eccentric part and the other contact pressure face can be varied. Such a contact pressure device can be inserted between the sealing strip and the side wall of the joint gap if the eccentric part of the eccentric device is located in a position closest to the other contact pressure face. In the initial inserted position of the sealing strip, the spacing between the sealing strip and the side wall of joint gap is essentially greater than the least spacing between the surface of the eccentric part and the other contact pressure face. To perform the contact pressure operation, the eccentric device is rotated with the eccentric part moving alternately away from and towards the other contact pressure face. Such motion of the eccentric device causes the sealing strip to be pressed against one side wall of the joint gap and then affords the movement at the contact pressure device and/or of the tool in the gap in the structure.

The motion of the tool in the joint gap of the structure can also be effected by a conveying device connected to the tool. Such a conveying device can be arranged so that it abuts on the surface of the structure or in the gap by sliding or rolling members moved by driven elements, such as drive wheels, engaging the outside surface of the structure or in the joint gap. Together the sliding or rolling elements and the driven members can form the stop for the tool.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
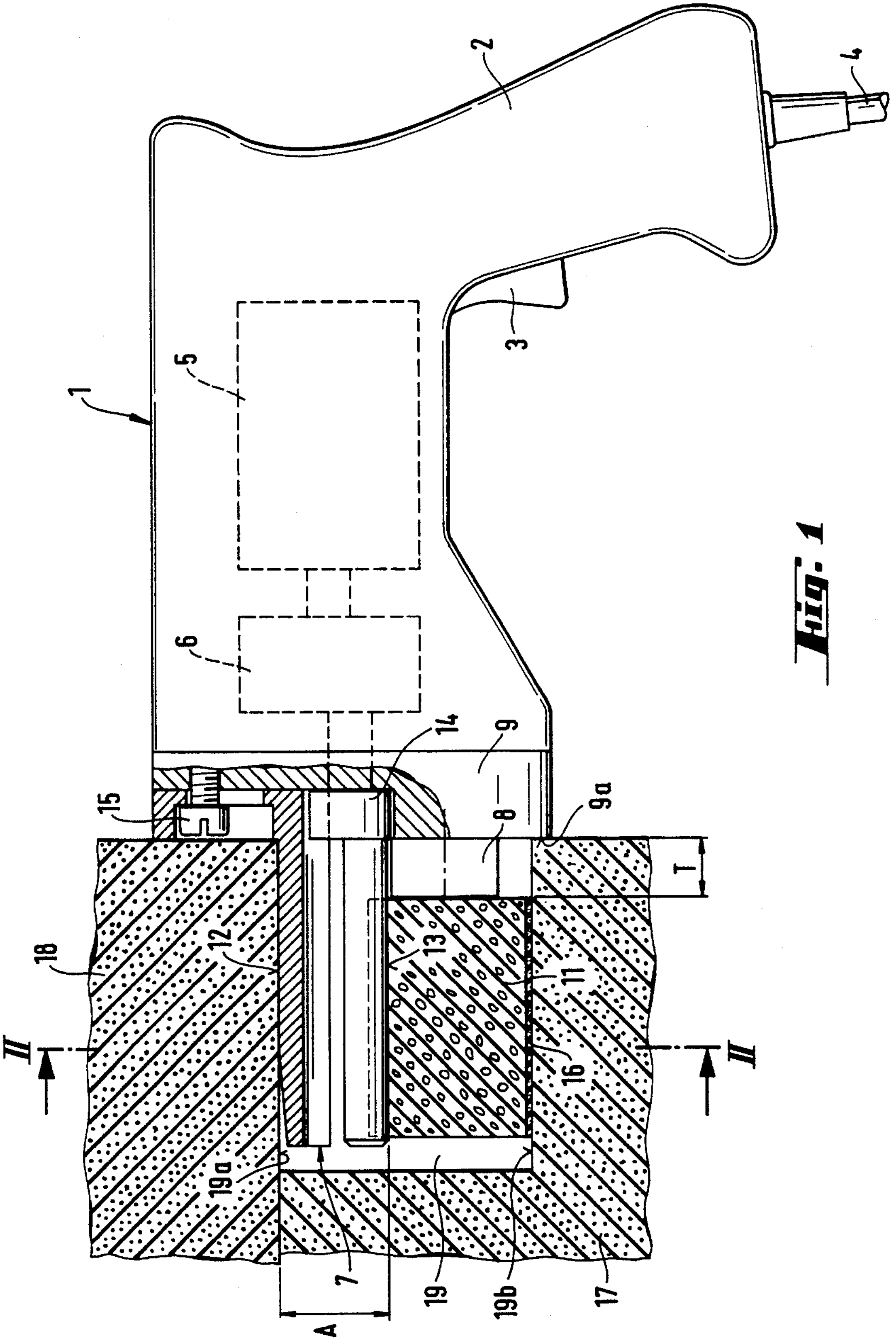
FIG. 1 is a side elevational view of a tool embodying the present invention for placing sealing strip into a joint gap in a structure with the tool displayed in a position ready to exert contact pressure on the strip, and with a part of the tool shown in section.
Figure 2:
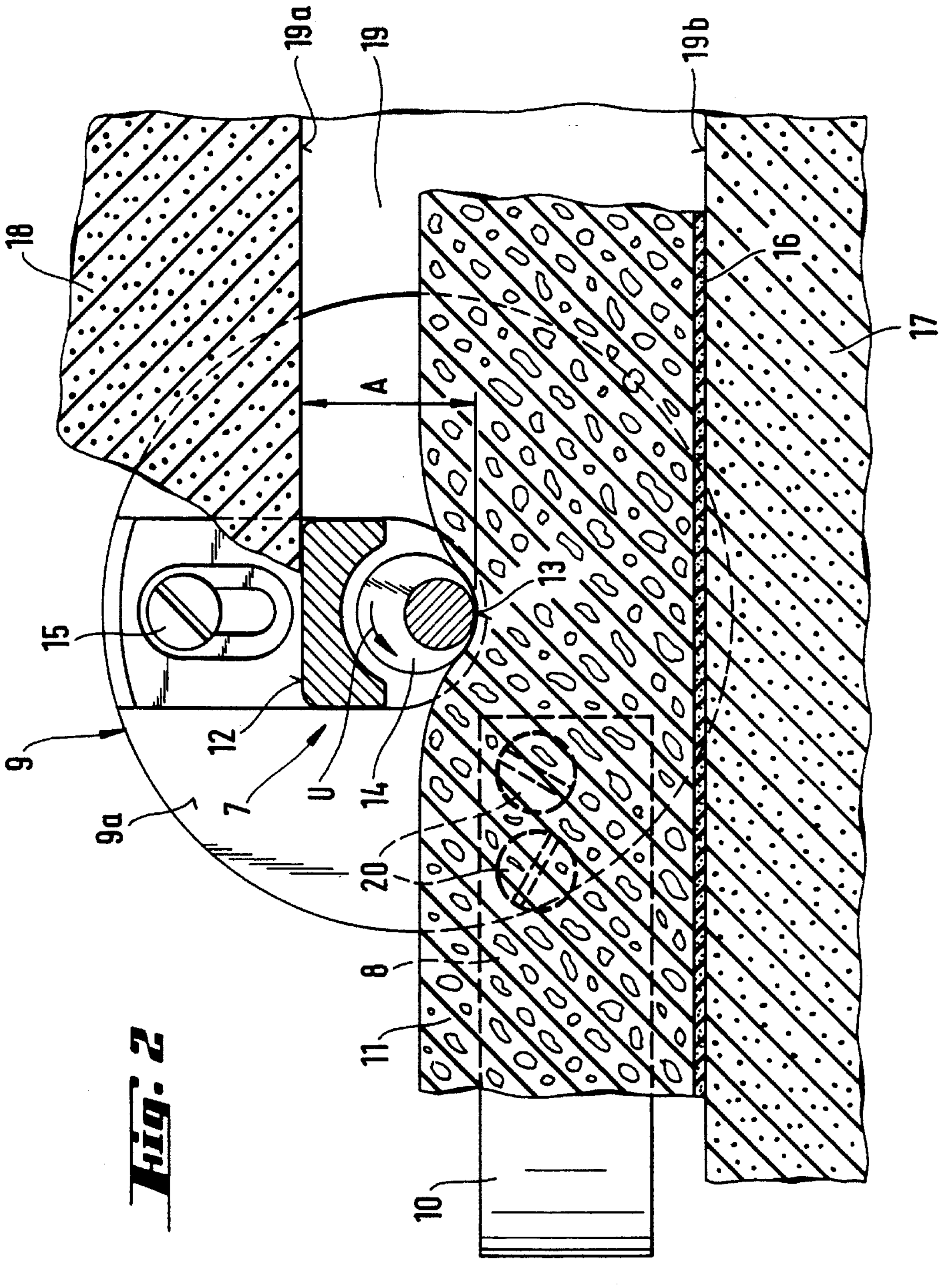
FIG. 2 is a sectional view of the tool shown in FIG. 1 taken along the line II—II.

A tool for placing sealing strip 11 is shown in FIGS. 1 and 2 and includes a housing 1 with a handle 2 at one end of the housing containing an actuating switch 3 and an electrical connection 4. An electric drive motor 5 and a step-down gear box 6 is located within the housing 1. At the opposite end of the housing from the handle there is a stop 9 with a stop face 9*a*, a lead-in device 10, an insertion device 8 and a contact pressure device 7 extending axially outwardly from the housing. The contact pressure device 7 is shown extending into a joint gap 19 formed by structural components 17, 18. The contact pressure device has one axially extending contact pressure face 12 in contact with one side wall 19*a* of the gap 19 and another contact pressure face 13 bearing against the sealing strip 11 and closest to the other side wall 19*b* of the gap. Sealing strip 11 is adhesively connected to the side wall 19*b* of the joint gap 19 by an adhesive layer 16. The contact pressure face 13 is formed by an outer surface or face of an eccentric part of an eccentric 14 extending through the stop 9 and from the stop face 9*a*. The eccentric part of eccentric 14 forming the contact pressure face 13 is rotatable relative to the contact pressure face 12 . The eccentric 14 extends into the housing 1 and is connected to the step-down gear box 6 which is driven by the motor 5. Motor 5 is operated by the actuating switch 3 which controls the current flow to the motor. When the eccentric 14 is rotated, the outer spacing A between the two contact pressure faces 12, 13 changes alternately. As can be noted in FIG. 2 the stop 9 is circular and its stop face 9*a* is arranged to bear against the surface of the structural components 17, 18. The contact pressure face 13 on the eccentric 14 is located at the stop face 9*a* or in a recess of the stop 9 so that it can be displaced axially to a limited extent. The contact pressure face 12 is fixed to the stop 9 by a screw 15.

Lead-in device 10 and insertion device 8 form a single part and are located at the stop. Both of these devices are fastened to the stop by two screws 20, note FIG. 2. The lead-in device is formed with a lead-in bevel for placing the sealing strip 11 into the joint gap 19. The sealing strip 11 is pressed by the insertion device 8 for an appropriate predetermined depth T into the gap 19 and subsequently is pressed by the contact pressure device 7 against the side wall 19*b* of the gap 19. When the eccentric 14 is rotated by the electric drive motor 5 and step-down gear box 6 in the circumferential direction U, note FIG. 2, a movement of the device within the gap occurs. After the insertion and the application of the contact pressure on the sealing strip 11 within the joint gap 19, the tool is removed from the gap, whereby the compression of the sealing strip is released and it expands closing the gap in a sealing manner with the strip abutting the two opposite sidewalls 19*a*, 19*b* of the gap.

Figure 3:
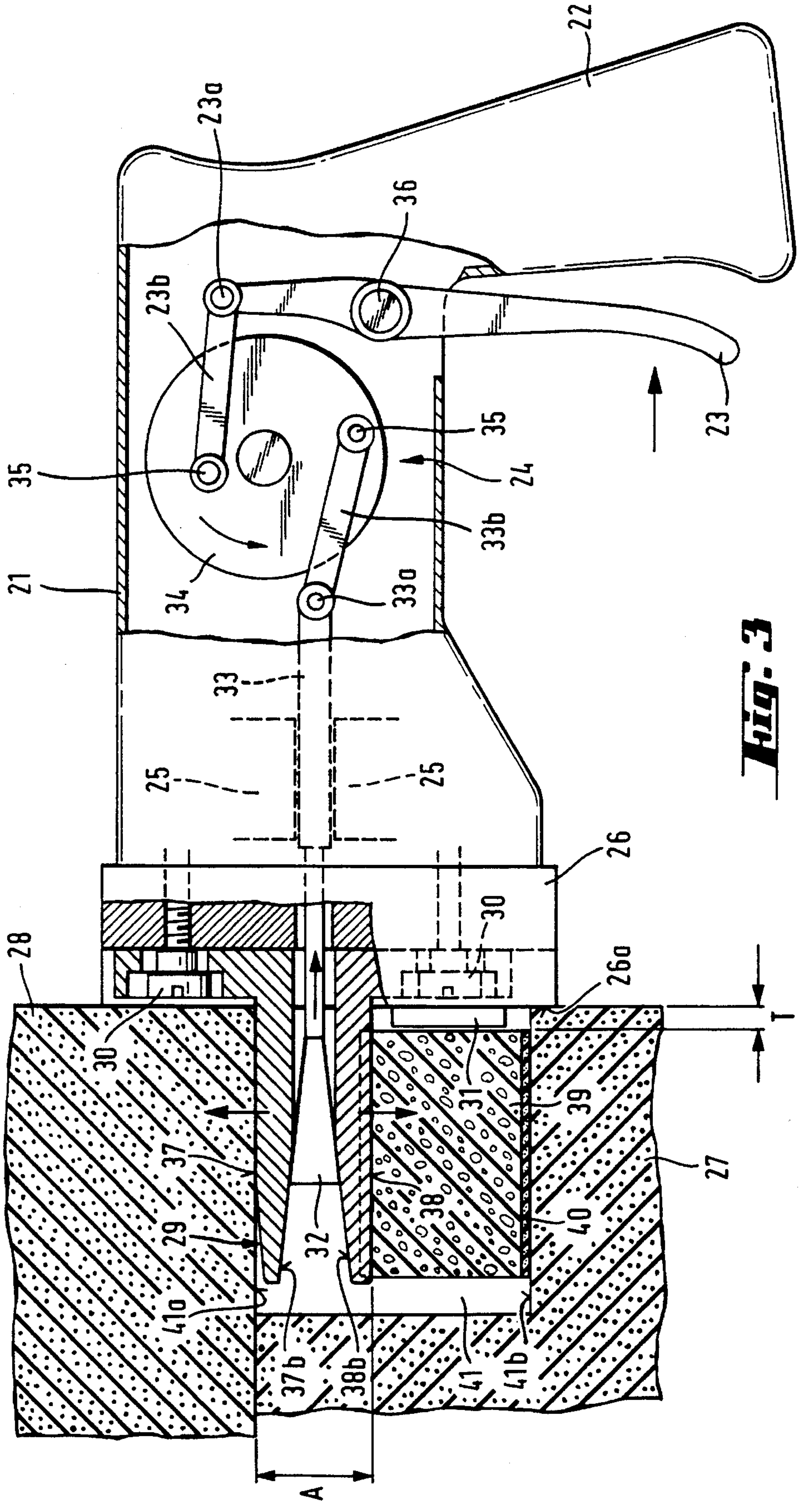
FIG. 3 is another tool embodying the present invention shown in a view similar to FIG. 1 and ready to exert contact pressure, with the tool shown partly in section.

In FIG. 3 another embodiment of the tool is shown for placing the sealing strip 39 within the joint gap 41 formed by the structural components 27, 28. This tool includes a housing 21 with a handle 22 at one end and an actuating device 23 located in the handle and connected to a step-up gear box 24 within the housing. At the opposite end of the housing from the handle there is a stop 26 with a stop face 26*a*, a lead-in device, not shown, an insertion device 31, and a contact pressure device 29 extending axially from the stop into the joint gap 41. Within the joint gap 41 of the structural components 27, 28 the contact pressure device has one contact pressure face 37 bearing against the side wall 41*a* of the gap while the other contact pressure face 38 presses the sealing strip 39 which is inserted into the gap in its compressed state. An adhesive layer 40 on the sealing strip 39 is in contact with the side wall 41*b* of the gap 41. Contact pressure faces 37, 38 cooperate with a wedge member 32, note the wedge member has inclined outer faces converging inwardly toward the stop face 26*a*. The inner surfaces 37*b*, 38*b* of the contact pressure faces 37, 38 are shaped to be complementary with the inclined outer faces of the wedge member 32. At its end closest to the housing 21, the wedge member is connected to an actuating bar 33 guided in a support member 25 in the housing so that it is axially displaceable. The step-up gear box 24 is actuated by the actuating lever 23 and consists of a rotatable eccentric 34 located in the housing with two eccentrically disposed and spaced bearing elements 35 extending orthogonally from the eccentric 34. A transmission lever 23*b* connects the actuating lever 23 with one of the bearing elements 35 and another transmission lever 33*b* connects the other bearing element 35 to the actuating rod 33. An articulated joint 23*a*, 33*a* provides a connection between the articulating lever 23 and the transmission lever 23*b* and also between the actuating rod 33 and the transmission lever 33*b*. Actuating lever 23 is pivotally mounted on a bearing bolt 36 located in the housing 21.

If the actuating lever is moved in the direction of the handle 22, force is transmitted by the transmission lever 23 to the eccentric 34 causing it to rotate counterclockwise as viewed in FIG. 3. At the same time an axial displacement of the actuating rod 33 and of the wedge member 32 in the direction toward the handle is effected with the two contact pressure faces 37, 38 being moved outwardly away from one another into contact pressure with the gap side wall 41*a* and the adjacent surface of the strip 39. If the force on the actuating lever 23 is released, the transmission lever 23*b*, 33*b*, the eccentric 34, the actuating rod 33 and the wedge member 32 move back into their original position by the biasing action of spring elements, not shown, and the external spacing between the two contact pressure faces 37, 38 is reduced. The spring elements can coact with the contact pressure faces 37, 38 and/or with the actuating lever 23 as well as with the eccentric 34.

The circular stop 26 with its stop face 26*a* at the end of the housing 1 facing the structural components 27, 28 has two recesses at or in which the contact pressure faces 37, 38 are arranged so as to be axially displaceable to a limited extent. The contact pressure faces 37, 38 are fixed to the stop 26 by screws 30.

A lead-in device, not shown in FIG. 3, formed of a single part is mounted on the stop 26 along with a partially shown insertion device 31. These two devices are fixed to the stop 26 by screws, not shown. The lead-in device consists of a lead-in bevel for introducing the sealing strip 39 into the joint gap 41 and guiding it in the gap. The sealing strip 39 is pressed to an appropriate predetermined depth into the gap 41 by the insertion device 31 and subsequently is pressed against the side wall 41*b* of the gap 41 by the contact pressure device 29. After exerting contact pressure on the sealing strip 39 in the gap 41, the tool is pulled out of the gap 41, whereby the compression of the sealing strip 39 is released and the sealing strip closes the gap 41 in a sealing manner by its abutment against the two side walls 41*a*, 41*b* of the gap.

While a specific embodiment of the invention has been shown and described in detail to illustrate the inventive principles, it will be understood that the invention may be embodied otherwise without departing from said principles.

We claim:

1. A tool for placing and securing sealing strip (11, 39) in a joint gap (19,41) extending inwardly, from an outside surface of structural parts (17,18,27,28) with the joint gap having a pair of spaced apart sidewalls (19*a*,19*b*,41*a*, 41*b*), comprises a lead-in device (10) for guiding the sealing strip (11,39) into the joint gap (19,41), an insertion device (8,31) for pressing the sealing strip (11,39) for a predetermined depth into the joint gap (19,41), a stop (9,26) with a stop face (9*a*,26*a*) arranged for abutting the tool against the outside surface of the structural part, and a contact pressure device (7,29) arranged to project at least partially into the joint gap (19,41) for securing the sealing strip (11,39) in the gap (19,41), wherein the improvement comprises that said contact device (7,29) has at least two elongated coextensive contact pressure faces (12,13,37,38) arranged to extend into the joint gap, means connected to said contact pressure device for alternately moving said contact pressure faces (12,13,37,38) uniformly away from and towards one another for pressing the sealing strip against one of the said sidewalls of the joint gap and then releasing the sealing strip, and said contact pressure faces (12,13,37,38) having a variable spacing therebetween with a least spacing sufficient for inserting the contact pressure faces into the joint gap out of contact with the sealing strip.

2. Tool, as set forth in claim 1, wherein at least one said contact pressure face (13, 37) is connected to a drive moving said at least one contact pressure face (13, 37) relative to said other contact pressure face (12, 38) transversely of the coextension of said contact pressure faces.

3. Tool, as set forth in claim 2, wherein said drive comprises a manually operable actuating member.

4. Tool, as set forth in claim 2, wherein said drive comprises a drive motor (5).

5. Tool, as set forth in claim 2, wherein said at least one contact pressure face (13) is formed by an outer surface of an axially extending rotatable eccentric (14).

* * * * *